March 14, 1939.                H. GINGELL                2,150,274
MACHINE FOR TREATING ARTICLES OF SHEET MATERIAL
Filed Sept. 18, 1936            3 Sheets-Sheet 3

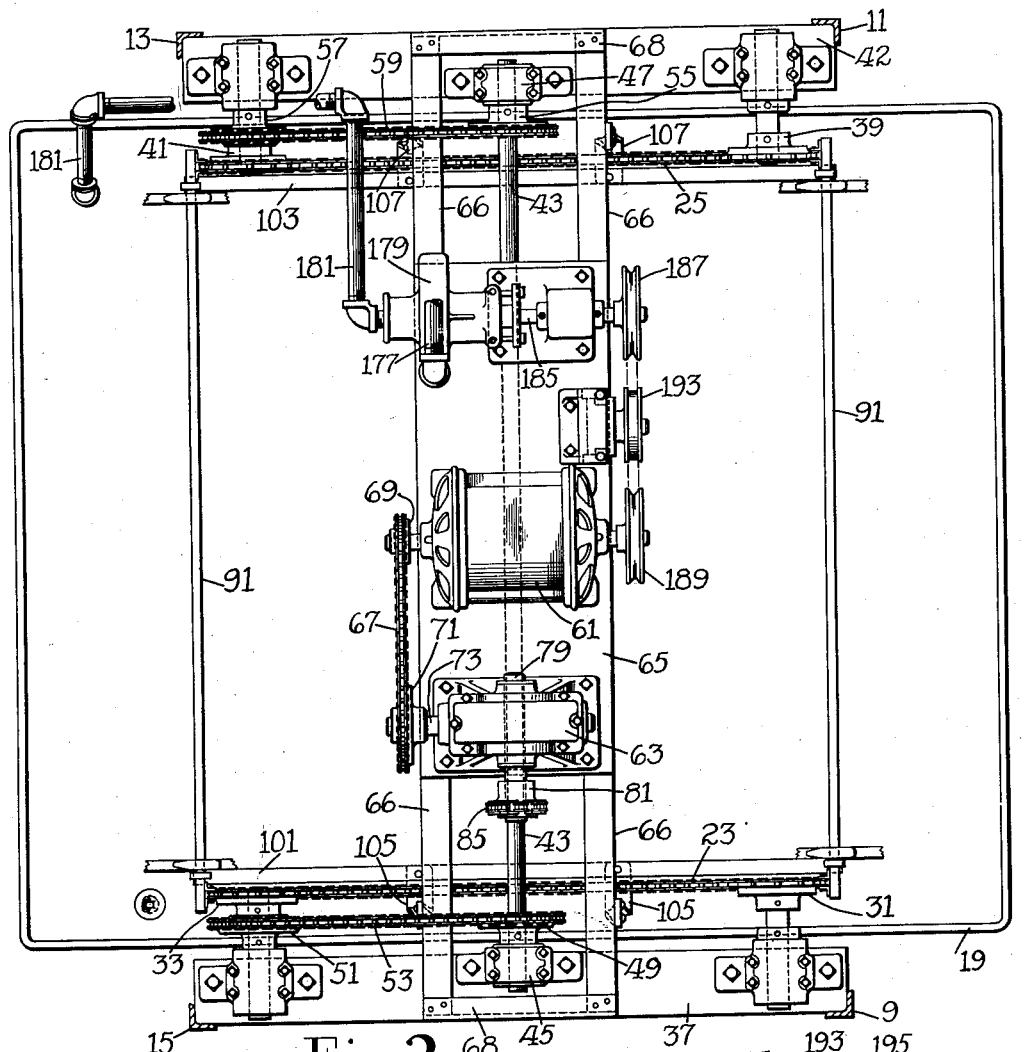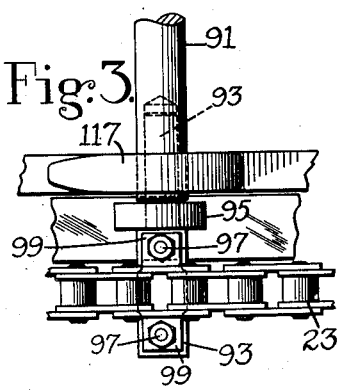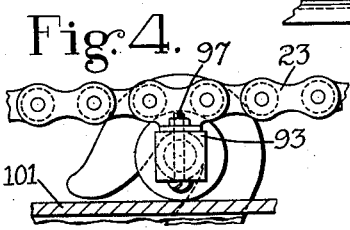
Fig. 2. Fig. 3. Fig. 4. Fig. 5.

INVENTOR
Harry Gingell
By his attorney
Harlow M. Davis

Patented Mar. 14, 1939

2,150,274

UNITED STATES PATENT OFFICE 2,150,274

MACHINE FOR TREATING ARTICLES OF SHEET MATERIAL

Harry Gingell, Johnson City, N. Y., assignor to United Shoe Machinery Corporation, Paterson, N. J., a corporation of New Jersey Application September 18, 1936, Serial No. 101,479

9 Claims. (Cl. 91—46)

This invention relates to machines for treating articles of sheet material and is herein illustrated as embodied in a machine which may be employed to temper soles intended for use in the manufacture of boots and shoes.

In the manufacture of shoes it is customary to treat the soles with a tempering liquid so as to put them into a condition suitable for certain operations to which they are subsequently subjected; and in the illustrated machine the soles are caused to travel through a liquid. In order to facilitate this travel and at the same time to expose the soles as thoroughly as possible to the liquid, there are provided, in accordance with one feature of the invention, means for causing articles of sheet material, such as soles, to travel in a closed path, and means for holding the articles on edge in spaced relation and with their planes substantially parallel to their direction of travel. And preferably this holding means includes a presser member which engages upper edges of the articles, as well as a backing member which engages their trailing ends. In the illustrated machine, soles are held upright, on edge in spaced relation, upon carriers suspended from a conveyor, the lower horizontal run of which travels above a body of tempering liquid in a receptacle in such manner that the soles are caused to travel through a portion of the liquid. A backing member, one for each carrier, engages the trailing ends of the soles to prevent them from being swept out of their carrier; and a presser member, one for each carrier engages the top edges of the soles to prevent them from rising.

These and other features of the invention, including certain details of construction and combinations of parts, will be set forth as embodied in an illustrated machine and pointed out in the appended claims.

In the drawings,

Fig. 2 is a section on the line II—II of Fig. 1;

Fig. 3 is a detail in plan showing more particularly the connection between one of the conveyor chains and one end of one of the rods from which the article supports or carriers are suspended;

Fig. 4 is an end elevation of the parts shown in Fig. 3;

Fig. 5 is an end elevation of the belt and pulleys for driving the pump;

Figure 1:
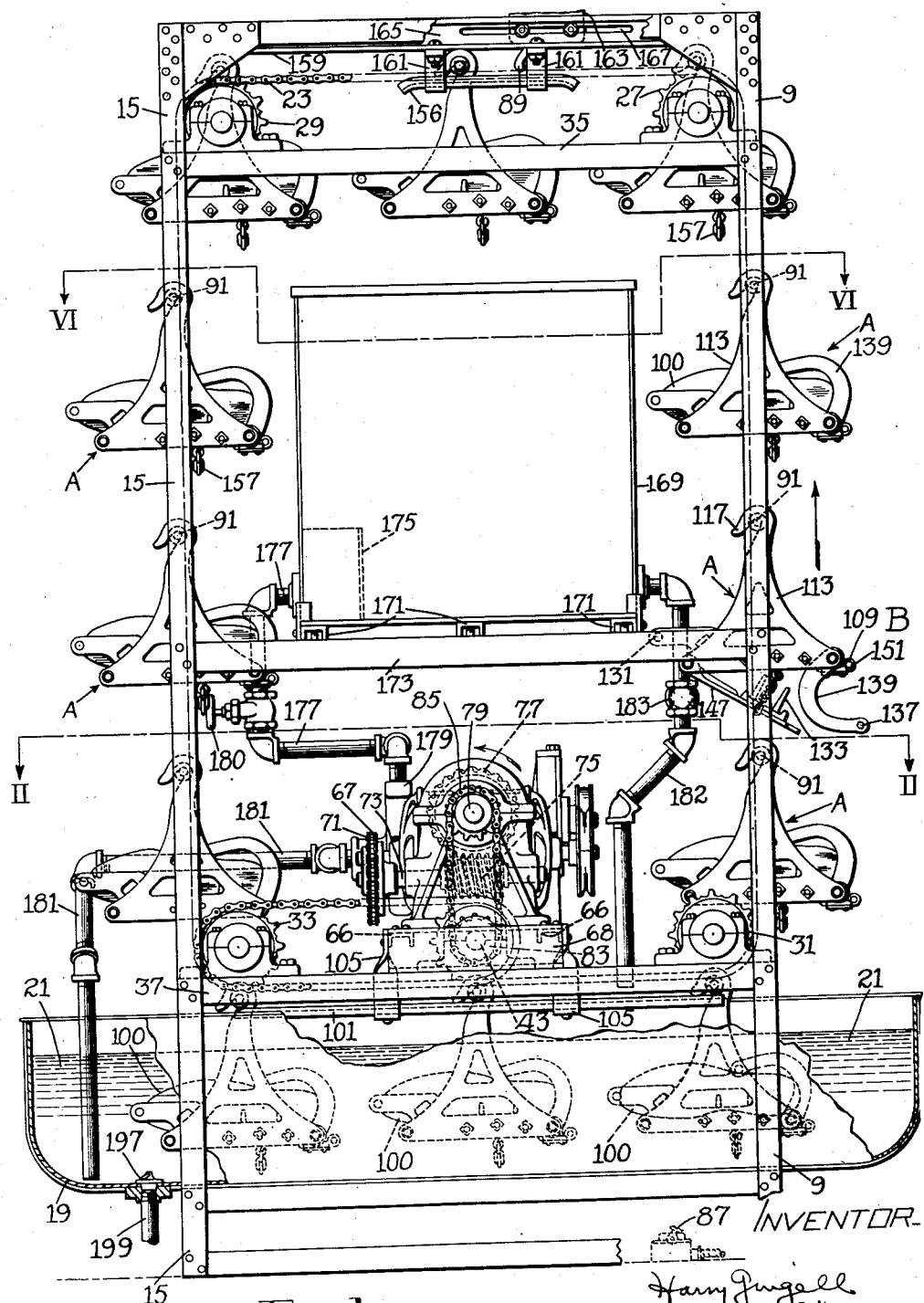
Fig. 1 is an end elevation of a machine in which the present invention is embodied.
Figures 6, 7:
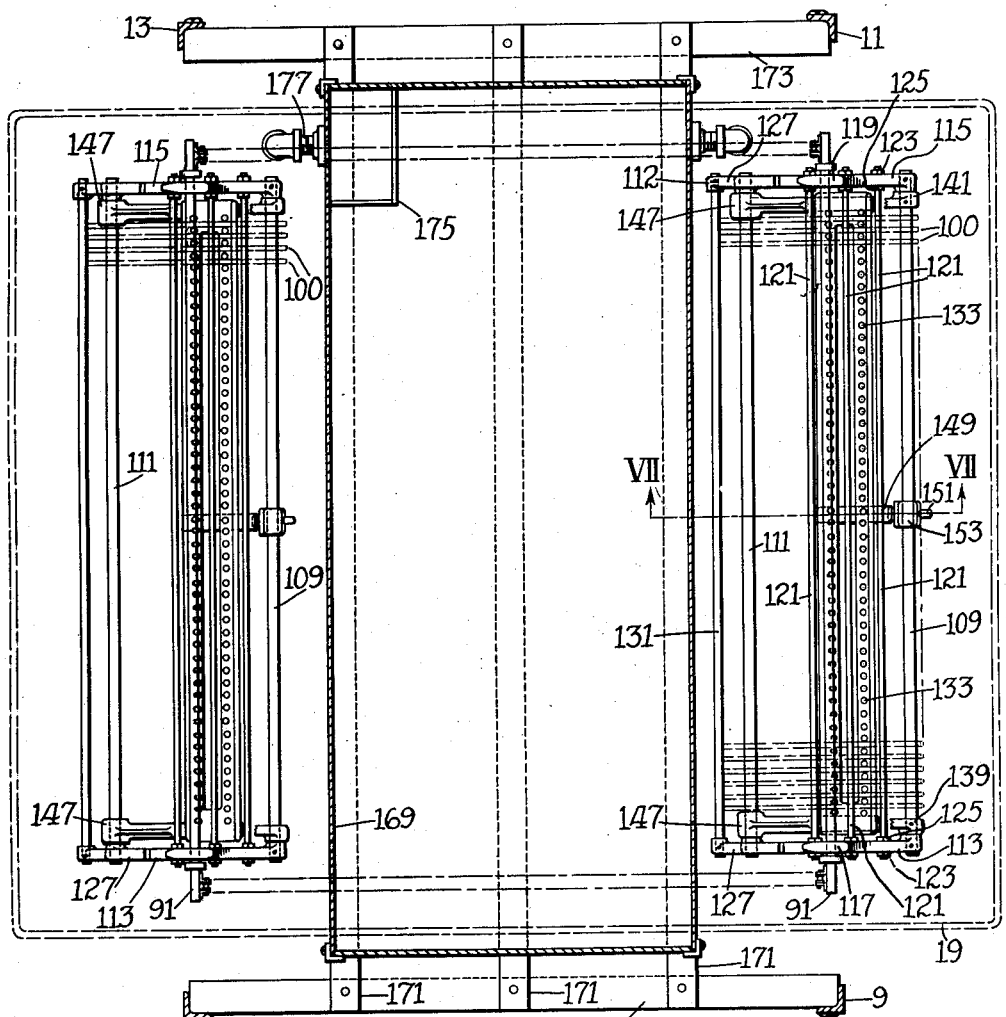
Fig. 6 is a section on the line VI—VI of Fig. 1.
Fig. 7 is a section on the line VII—VII of Fig. 6, a sole being shown in full lines in the position which it occupies while being carried through the tempering liquid, and being shown in dot-and-dash lines in the position in which it falls when certain spacing and supporting pins have been withdrawn.

Referring first to Figs. 1 and 6, the frame of the machine comprises four upright posts in the form of angle irons 9, 11, 13 and 15 arranged at the corners of a rectangle, the rest of the frame comprising principally certain crossbars supported directly or indirectly by these posts. Supported on crossbars, not shown, near the lower ends of the uprights, is a receptacle 19 for a tempering liquid 21 through which articles such as soles 100 are passed to temper them. The soles are held in article supports or carriers, each indicated as a whole by A (Fig. 1), and suspended by hooks from opposite ends of rods 91 which in turn are fastened at their opposite ends to two conveyor chains 23, 25, the chain 23 being shown in Fig. 1, and a part of the chain 25, which is directly behind it as viewed in that figure, being shown in Fig. 2. The chain 23 (Fig. 1) passes around two sprockets 27, 29 near the top of the frame and around two sprockets 31, 33 near the bottom of the frame. The spindles of the two upper sprockets 27, 29 are rotatably mounted in bearings which are bolted to a crossbar 35, and the spindles of the two lower sprockets 31, 33 are rotatable in bearings bolted to a crossbar 37. The sprockets of the other chain 25 (Fig. 2) are mounted in a similar manner. The spindle of the two lower sprockets 39, 41 shown in that figure are rotatably mounted in bearings which are bolted to a crossbar 42. The chains 23, 25 are both driven from a countershaft 43 which is rotatably mounted at one end in a bearing member 45 bolted to the crossbar 37 and at its other end in a bearing member 47 bolted to the crossbar 42. Near one of its ends the countershaft carries a sprocket 49 around which and around a sprocket 51 fast to the spindle of the sprocket 33 passes a chain 53. Near the other of its ends the countershaft 43 carries a sprocket 55 around which and around a sprocket 57 fast to the spindle of the sprocket 41 passes a chain 59. The countershaft 43 is driven by a motor 61 through a reduction gearing in a gear box 63, the motor and the gear box being mounted upon a plate or bed 65 which is located above the countershaft 43, said bed 65 being supported on two channel bars 66 which in turn are riveted respectively to the upper portions of comparatively wide channel bars 68 supported respectively on the crossbar 37 and on the crossbar 42. A chain 67 passes around a sprocket 69 on one end of the shaft of the motor and around a sprocket 71 fast to the outer end of a horizontal shaft 73 which extends into the gear box and carries a worm 75 (Fig. 1) in mesh with a worm gear 77 fast to a short horizontal shaft 79. One end of this shaft which projects from the gear box carries a sprocket 81 around which and around a sprocket 83 (Fig. 1) on the countershaft 43 passes a chain 85. With this construction rotation of the motor 61, through the driving connections which have just been described, will cause the two chains to move slowly in unison. The chains are caused to move a short distance and then brought to rest by an electrical control mechanism, not shown. The motor is started by the operator who manipulates with his foot a switch control member 87 (shown at the bottom of Fig. 1) to cause current to flow from a supply line to the motor. The motor rotates until a part of one of the sole carriers operates another switch control member 89 (Fig. 1) near the top of the machine whereupon current is cut off from the motor and remains cut off until the member 87 is again manipulated. This electrical control system is not shown, since the details of its construction form no part of the present invention and any suitable control system may be used which will cause intermittent movement of the conveyor in the manner described. It will be understood, however, that the operator starts each movement of the conveyor, and that it moves a distance equal to the distance between any two of the equally spaced sole carriers and then comes to rest.

The rods 91 from which the sole carriers are suspended have their opposite ends fastened respectively to the chain 23 and the chain 25 at equally spaced intervals and are provided near each end with a roll. Referring to Figs. 3 and 4, the manner in which one end of one rod is fastened to the chain 23 and the mounting of one roll will be described, it being understood that the other end of the rod is fastened in a similar manner to the other chain and carries at its other end another roll. Driven into a socket in one end of the rod is the stem of a pin 93. Upon a cylindrical portion of this pin near the end of the rod 91 is mounted a roll 95. The portion of the pin 93 which extends out beyond the roll is square in cross section and is fastened by two bolts 97 to two ears 99 which project from a link of the chain 23. Referring to Fig. 1, it will be noted that the conveyor chains move up from the right-hand end of the receptacle 19, then across the top of the machine, then down toward the left-hand end of the receptacle, and then across the bottom of the machine just above the receptacle. During this last horizontal movement the rolls 95 on the rods ride on horizontal tracks, the rolls nearest to the observer in Fig. 1 riding on the track 101 and those at the farther end of the machine riding on the track 103 (Fig. 2). The track 101 (Fig. 1) is suspended by two hangers 105 from the channel bars 66, and the track 103 (Fig. 2) is suspended from the same channel bars by hangers 107. The sole supports or carriers, as has been stated, are suspended from the equally spaced rods 91; and the purpose of the tracks 101, 103 is to resist the downward pull of these sole carriers when they are being drawn through the liquid in the receptacle by the lower horizontal runs of the conveyor chains.

Referring more particularly to Figs. 6 and 7, with occasional references to Fig. 1, the construction and mounting of one of the sole carriers A will be described. Each sole carrier or article support comprises a frame consisting of two hollow rods 109, 111 fastened by cotter pins 112 in bores in two generally triangular end members 113, 115 having at their upper ends respectively hooks 117, 119 by which the frame is suspended from one of the rods 91. The triangular end members 113, 115 are also connected by three small stay rods 121 rigidly fastened to said end members by end nuts 123 and check nuts 125. Fastened respectively to the left-hand sides of the end members 113, 115 are brackets 127 having alined bores in which are fastened by cotter pins 129 the opposite ends of a rod 131. This rod engages the trailing ends of the soles 100 and serves as an abutment or backing member to resist the tendency of the soles to be swept out of the carrier when they are passing through the tempering liquid. In order to hold the soles on edge in spaced relation and in planes substantially parallel to their direction of travel, the soles rest with their lower edges upon the rods 109, 111, 121, or some of them, and are held upright in separated relation by spacer pins 133 which project upward in pairs from a base plate 135. In order to press the soles down upon the rods 109, 111, 121 a presser is provided in the form of a rod 137 having its opposite ends fastened by cotter pins respectively in alined bores in the ends of two curved arms 139, 141 the hubs of which are rotatably mounted on the hollow rod 109. In Fig. 7, and in all but one instance in Fig. 1, these arms are shown swung to the left into operative position in which the rod 137 is pressed down upon the top edges of the soles. In Fig. 1, however, the sole carrier A which is at the loading station (indicated by B) has its arms swung down to the right about the axis of the hollow rod 109 into inoperative position.

When a sole carrier arrives at the loading station B and comes to rest, the operator removes the soles which have been tempered and replaces them by soles which are to be tempered. It would take considerable time to pick up the soles one by one from between the spacer pins 133 after the presser rod 137 has been swung down out of the way; and to avoid such a procedure, the spacer pins 133 are swung down into inoperative position, as shown in dot-and-dash lines in Fig. 7 as well as at the loading station in Fig. 1, whereupon the soles fall on their sides in overlapping relation into the position of the sole shown in dot-and-dash lines in Fig. 7. The operator may then slide the tempered soles together, for example by holding one hand in engagement with the sole at one end of the series and with a sweep of his other hand gathering them into a bunch, and remove them from the sole carrier. In order to permit the spacer pins 133 to be dropped from between the soles at the loading station, the base plate 135 by which the pins are carried is fastened by screws to two arms 147 (Fig. 6), said arms having hubs which are rotatably mounted on the hollow rod 111. To the under side of the base plate 135 at about its middle is fastened a latch 149 the right-hand end of which (Fig. 7) normally rests upon the left-hand end of a catch 151 which is slidably mounted in a block 153, said block having a bore to receive the hollow rod 109 and being fastened thereto by a cotter pin 155. A tension spring 157 which engages with one end a shoulder on the block and with its other end a shoulder on the catch 151 tends at all times to hold the catch in the operative position shown. When, however, the handle of the catch is grasped and pulled to the right, the latch 149 is released, and the base plate 135 with its spacer pins swings down into the dot-and-dash line position shown in Fig. 7 whereupon the soles fall over on their sides in more or less overlapping relation and may readily be gathered up and removed. The extent to which the arms 147 may swing down when the catch 151 is disengaged is limited by two short chains 158 which are fastened by their upper ends respectively to the end members 113, 115 and at their lower ends respectively to the arms 147.

In the operation of the machine the operator stands in front of the loading station B (Fig. 1). The sole carrier A shown at that station has just been unloaded by pulling out the catch 151 and allowing the arms 147 to swing down, by swinging the arms 139 with their presser rod 137 outward and downward, and by sweeping the soles into a bunch and removing them. The operator now swings up the base member comprising the arms 147, the base plate 135, the pins 133 and the latch 149 until this latch snaps over the catch 151. He then fills the sole carrier with soles to be tempered by placing each sole between two pairs of spacer pins with its lower edge resting upon some or all of the rods 109, 111, 121 and with one of its ends (the toe end as here shown) abutting the rod 131, and finally he swings the arms 139 upward and inward to cause the presser rod 137 to rest upon the upper edges of the soles. After the sole carrier at the loading station has been loaded with fresh soles, the operator manipulates the switch control 87 with his foot whereupon the motor starts to rotate and the conveyor chains move a distance equal to the distance between any two of the supporting rods 91 by reason of the fact that one of these rods (the one at the upper right-hand corner of Fig. 1) operates the switch control 89 to shut off the current from the motor. In order to ensure that the upper runs of the conveyor chains shall be held up so as to operate the switch control 89 without fail, two tracks are provided for these upper runs of the chain, one of these tracks being shown at 156 in Fig. 1 as suspended from a crossbar 159 by hangers 161. The track for the other chain is like the track 156 and is similarly supported from a crossbar like the crossbar 159. The conveyor chains are thus caused to move intermittently in the manner described and to come to rest in the position shown in Fig. 1 with three of the sole carriers immersed in the liquid in the receptacle 19. The upper switch control 89 is carried by a slide member 163 adjustably fastened to a crossbar 165 by bolts which pass through bores in the member and through a slot 167 in the crossbar. It is thus possible to change the location of the switch control 89 so as to vary the position in which the conveyor chains come to rest.

In order to provide means for withdrawing liquid from the receptacle 19 and supplying liquid thereto, a tank 169 is supported on three channel bars 171 which in turn are supported by two crossbars 173 to which the opposite ends of the channel bars are riveted. In the lower part of the tank 169 is a priming chamber 175 into which opens the discharge end of a pipe 177 which leads from the discharge opening of a pump 179, a hand valve 180 being provided in said pipe. A suction pipe 181 leads from near the bottom of the receptacle 19 to the inlet opening of the pump. From near the bottom of the tank 169 a pipe 182 is arranged to discharge the contents of the tank into the receptacle 19 when a hand valve 183 in this pipe is open. The pump 179 (Fig. 2) is of the rotary type, the shaft 185 of its rotor having fast to one end a pulley 187 around which and around a pulley 189 on the shaft of the motor 61 extends a belt 191. A belt tightener pulley 193 (Fig. 5) is rotatably carried by a block which is vertically slidable on two upright slides 195 and rests upon the upper run of the belt. A drain plug 197 (Fig. 1) in the bottom of the receptacle 19 covers the upper end of a drain pipe 199. With this construction it is possible to maintain any predetermined level of liquid in the receptacle 19 or to empty the receptacle entirely if desired.

Although the invention has been set forth as embodied in a particular machine, it should be understood that the invention is not limited in the scope of its application to the particular machine which has been shown and described.

Having thus described my invention, what I claim as new and desire to secure by Letters Patent of the United States is:

1. A machine for treating articles of sheet material having, in combination, means for causing them to travel in a closed path, and means for holding the articles loosely on edge in spaced relation and with their planes substantially parallel to their direction of travel, said holding means including a backing member for engaging the trailing ends of the articles.

2. A machine for treating articles of sheet material having, in combination, means for causing them to travel in a closed path, and means for holding the articles loosely on edge in spaced relation and with their planes substantially parallel to their direction of travel, said holding means including a frame upon which the lower edges of the articles rest and a presser for engaging the upper edges of the articles.

3. A machine for treating articles of sheet material having, in combination, a conveyor, means for driving the conveyor, and an article support carried by the conveyor, said article support comprising a frame, spacers for holding the articles loosely on edge in spaced relation on the frame in planes parallel to their direction of travel, and a presser for engaging the upper edges of the articles.

4. A machine for treating articles of sheet material having, in combination, a conveyor, means for driving the conveyor, and an article support carried by the conveyor, said article support comprising a frame, spacers for holding the articles on edge in spaced relation on the frame, a presser for engaging the upper edges of the articles, and a backing member in engagement with the trailing ends of the articles.

5. A machine for treating articles of sheet material having, in combination, a receptacle for liquid, a conveyor for carrying articles through the liquid, and an article support suspended from the conveyor, said article support comprising a frame, spacers for holding the articles loosely on edge and in spaced relation on the frame, and a presser for engaging the upper edges of the articles, said presser being mounted for movement away from the articles to permit ready access to them.

6. A machine for treating articles of sheet material having, in combination, a receptacle for liquid, a conveyor for carrying articles through the liquid, and an article support suspended from the conveyor, said article support comprising a frame, spacers for holding the articles on edge and in spaced relation on the frame, and a presser for engaging the upper edges of the articles, said presser being mounted for movement away from the articles to permit ready access to them, and said spacers being mounted for withdrawal from operative position to permit the articles to fall when it is desired to remove them.

7. A machine for treating articles of sheet material having, in combination, a conveyor, means for driving the conveyor, and an article support carried by the conveyor, said article support comprising a frame on which the articles rest, a base carried by the frame and movable into either operative or inoperative position, spacers carried by the base and adapted when the base is in operative position to hold the articles on edge and in spaced relation, and a presser also carried by the frame and movable into either operative or inoperative position and adapted when in operative position to engage the upper edges of the articles.

8. A machine for treating articles of sheet material having, in combination, a conveyor, means for driving the conveyor, and an article support carried by the conveyor, said article support comprising a frame on which the articles rest, a base carried by the frame and movable into either operative or inoperative position, spacers carried by the base and adapted when the base is in operative position to hold the articles on edge and in spaced relation, a presser also carried by the frame and movable into either operative or inoperative position and adapted when in operative position to engage the upper edges of the articles, and a backing member adapted to engage the edges of the articles at a locality between their upper and lower edges.

9. A machine for treating articles of sheet material having, in combination, a conveyor, means for driving the conveyor, and an article support carried by the conveyor, said article support comprising a frame on which the articles rest, a base hinged to the frame, spacers carried by the base, a catch normally holding the base up with the spacers in operative position and adapted when released to permit the frame to swing down to withdraw the spacers, and a presser also hinged to the frame and movable from operative to inoperative position.

HARRY GINGELL.